United States Patent [19]

Kendall et al.

[11] 4,418,722

[45] Dec. 6, 1983

[54] PRESSURE LETDOWN METHOD AND DEVICE FOR COAL CONVERSION SYSTEMS

[75] Inventors: James M. Kendall, Pasadena; John V. Walsh, Glendora, both of Calif.

[73] Assignee: The United States of America as represented by the Administrator of the National Aeronautics and Space Administration, Washington, D.C.

[21] Appl. No.: 259,211

[22] Filed: Apr. 30, 1981

[51] Int. Cl.³ ............................................. G05D 16/00
[52] U.S. Cl. ....................................... 138/42; 251/127
[58] Field of Search ................. 137/1, 14; 138/41, 42; 202/270; 201/35, 44; 208/8; 48/210; 60/39.02, 39.12; 251/127

[56] References Cited

U.S. PATENT DOCUMENTS

| | | | |
|---|---|---|---|
| 2,923,319 | 2/1900 | Cantrell | 251/127 X |
| 3,813,079 | 5/1974 | Baumann | 251/127 |
| 3,935,469 | 1/1976 | Haydock | 60/39.02 X |
| 3,954,124 | 5/1976 | Self | 251/127 X |
| 4,113,050 | 9/1978 | Smith | 138/41 X |
| 4,162,784 | 7/1979 | Legille | 251/127 X |
| 4,327,058 | 4/1982 | Tillingbast | 422/232 |

*Primary Examiner*—Alan Cohan
*Attorney, Agent, or Firm*—John R. Manning; Paul F. McCaul; Thomas H. Jones

[57] ABSTRACT

In combination with a reactor for a coal utilization system, a pressure letdown device for accepting from a reactor, a polyphase fluid at an entrance pressure and an entrance velocity, and discharging the fluid from the device at a discharge pressure substantially lower than the entrance pressure and at a discharge temperature and a discharge velocity substantially equal to the entrance temperature and entrance velocity. The device 10 is characterized by a series of pressure letdown stages 28a through 28x including a plurality of symmetrical baffles, designated 30, disposed in coaxially nested alignment, each baffle having defined therein a plurality of ports or apertures 32 of uniform dimensions. The number of ports or apertures for each baffle plate is unique with respect to the number of ports or apertures defined in each of the other baffles of the plurality, the mass rate of flow for each port being a function of the area of the port, the pressure of the fluid as applied to the port and a common pressure ratio established across the ports.

2 Claims, 3 Drawing Figures

PRESSURE LETDOWN METHOD AND DEVICE FOR COAL CONVERSION SYSTEMS

ORIGIN OF THE INVENTION

The invention described herein was made in the performance of work under a NASA Contract and is subject to the provisions of Section 305 of the National Aeronautics and Space Act of 1958, Public Law 85-568 (72 STAT. 435; 42 U.S.C. 2457).

BACKGROUND OF THE INVENTION

The invention relates generally to pressure dissipating systems for high-pressure polyphase fluids, and more particularly to a letdown device adapted to be coupled with a discharge orifice for a coal conversion system and employed in reducing output pressure, without experiencing a temperature drop, flashing or encountering serious erosion resulting from particulates entrained in the fluid.

The term "flashing", as herein employed refers to a phenomenon which may occur during pressure letdown when a liquid evolves into the gas phase. If uncontrolled or not limited, the rapid change in pressure may result in an implosion which can damage a surface such as the interior of a valve, ect.

Further, the term "entrainment", as herein employed, refers to a condition of flow of a fluid in which all components (solid, liquid, and/or gas) are maintained at the same velocity.

As is well known, polyphase fluids emerging from coal conversion systems usually consist of a flashable lliquid, which tends to evolve into a gas, transporting extremely hard and erosive particulate solids. Such fluids, when emerging from coal conversion systems are characterized by not only high temperatures but also high pressures. As a consequence of the damage resulting from the effects of the erosive solids and liquid flashing, the longevity of the plumbing utilized in handling such polyphase fluids is brief. Even so, in processes such as coal liquefaction, it is imperative that pressures be letdown or dropped while, preferably, maintaining constant enthalpy.

Since separation of the phases of the polyphase fluids results in detrimental differences in the flow velocities for the different phases, as well as an excessive distribution of velocities in the bulk flow, it is necessary in order to minimize damage that entrainment of the phases be maintained, whereby a common velocity may be imposed on all phases of the fluid.

As also is well known, in one form of coal conversion, gasification, the process tends to produce large quantities of high-pressure polyphase fluids including solids, liquids, and gasses, at temperatures approximating one thousand (1,000) degrees F. at pressures of approximately 3000 PSI.

PRIOR ART STATEMENT

Description of the Prior Art

As a consequence of a preliminary search conducted for a system capable of reducing fluid pressures in letdown systems, for coal conversion facilities, characterized by a series of coaxially aligned cones having a plurality of commonly dimensioned apertures, but differing numbers, the patents listed on the enclosed "List Of Prior Art Cited By Applicant" were discovered.

It is not believed that any of the aforementioned patents disclose or even suggest a pressure letdown device for a coal conversion system as hereinafter described and claimed, through which gas pressures readily may be reduced substantially to ambient pressure without experiencing the severe damage normally experienced in pressure letdown devices for polyphase fluids including flashable liquids, as well as particulates.

It is therefore, the general purpose of the instant invention to provide for use in combination with a coal conversion system an improved letdown device, characterized by increased longevity, for reducing pressures for high-pressure fluid to ambient pressure.

OBJECTS AND SUMMARY OF THE INVENTION

It is an object of the instant invention to provide for use in combination with a pressurized source of fluid an improved letdown device for reducing fluid pressures.

It is another object of the instant invention to provide a durable letdown device for reducing the pressure of a flashable fluid having entrained therein abrasive particulates.

It is another object to provide an improved letdown device for accepting particle-laden fluid at a first pressure and velocity and discharging the fluid at the same velocity and a second pressure less than the first pressure.

It is another object to provide a letdown device particularly suited for use as a pressure letdown device for coal conversion systems, such as gassification or liquefaction to reduce output pressures for fluids discharged therefrom.

It is another object to provide in combination with a coal conversion system a pressure letdown device having a capability of dropping pressures of reactor fluids to pressures approximating ambient atmospheric pressures without suffering the normally encountered deleterious effects of the flashable components and particles contained in the fluids.

It is another object to provide a letdown device which ensures that all phases of a polyphase fluid passing through all the stages of the letdown device remain entrained.

These and other objects and advantages are achieved through the use of a device characterized by a series of letdown stages comprising a plurality of baffles preferably of symmetrical configurations, such as conical, disposed in coaxially nested alignment, each of the baffles being characterized by a plurality of ports of uniform dimensions, the number of ports for each baffle being unique with respect to the number of ports for each of the other baffles, as will become more readily apparent by reference to the following description and claims in light of the accompanying drawings.

DESCRIPTION OF THE PREFERRED EMBODIMENT

Figure 1:
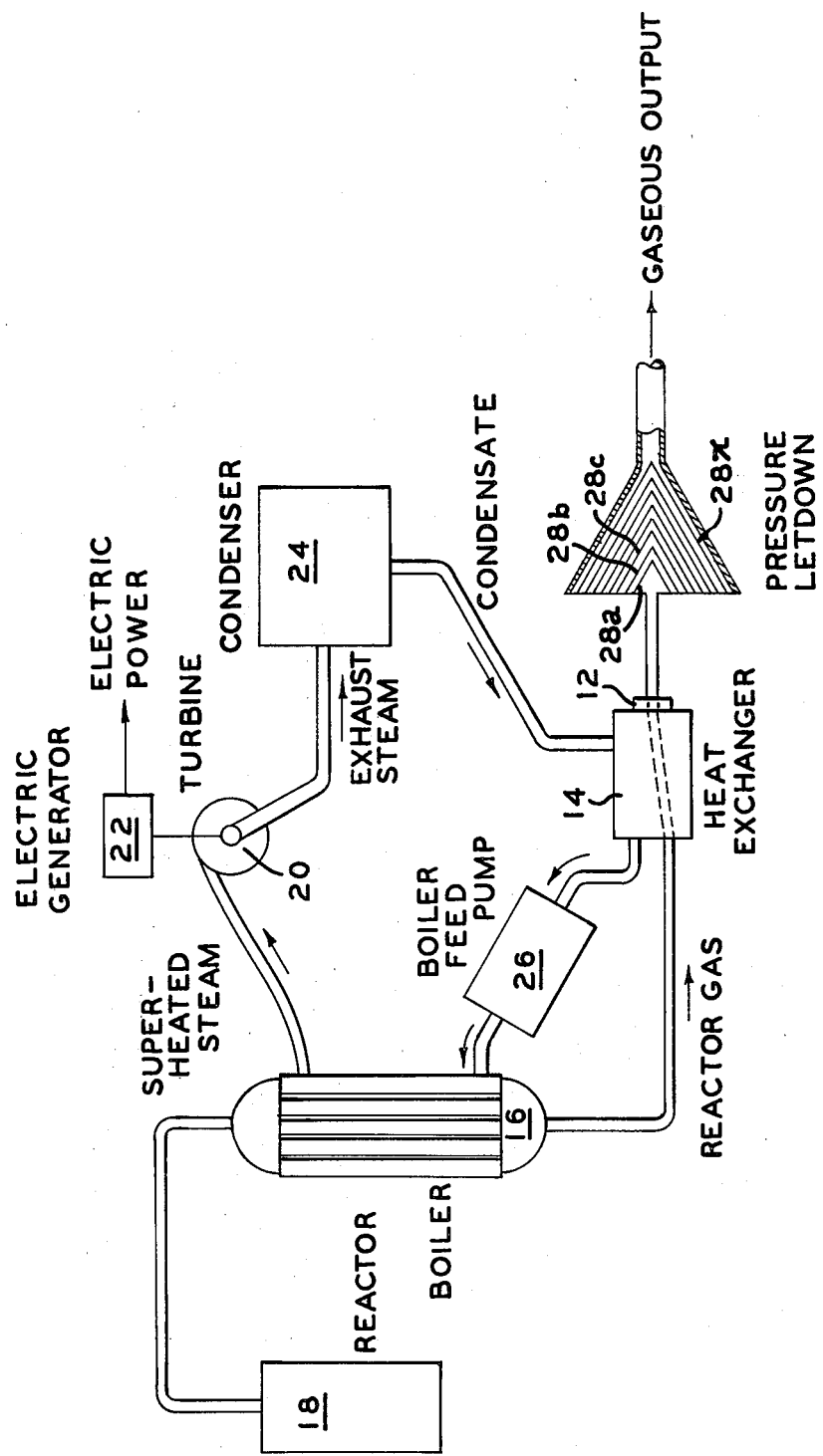
FIG. 1 is a schematic view, not to scale, of a typical coal utilization system employing a pressure letdown device embodying the principles of the instant invention.

Referring now to the drawings, with more particularity, wherein like reference characters designate like or corresponding parts throughout the several views, there is shown in FIG. 1 a coal utilization system within which the device 10, embodying the instant invention may be included.

It is, at this point, important to appreciate that the details of the structure provided for the coal utilization system illustrated in FIG. 1 forms no part of the invention hereinafter described and claimed. Accordingly, a detailed description of the system is omitted in the interest of brevity.

The pressure letdown device 10 is connected in a system having a discharge orifice, designated 12, for a heat exchanger 14 connected in series with a boiler 16, which in turn is supplied by a suitable coal reactor 18. The device 10, as shown, is connected downstream of the discharge orifice 12.

The thermal energy thus is utilized to convert a suitable liquid, such as water, for example, to super-heated steam. The steam is then utilized in driving a turbine 20. Where so desired, the turbine is empolyed to drive an electric generator, designated 22.

The exhaust steam from the turbine 20, as shown, is circulated through a condenser 24 with a condensate being drawn along a return path extended through a heat exchanger 14. A suitable pump 26 is provided for this purpose.

For further utilization of the reactor output, the letdown device 10 serves to reduce pressures to a manageable pressure, or a pressure substantially equal to atmospheric pressure.

Figure 2:
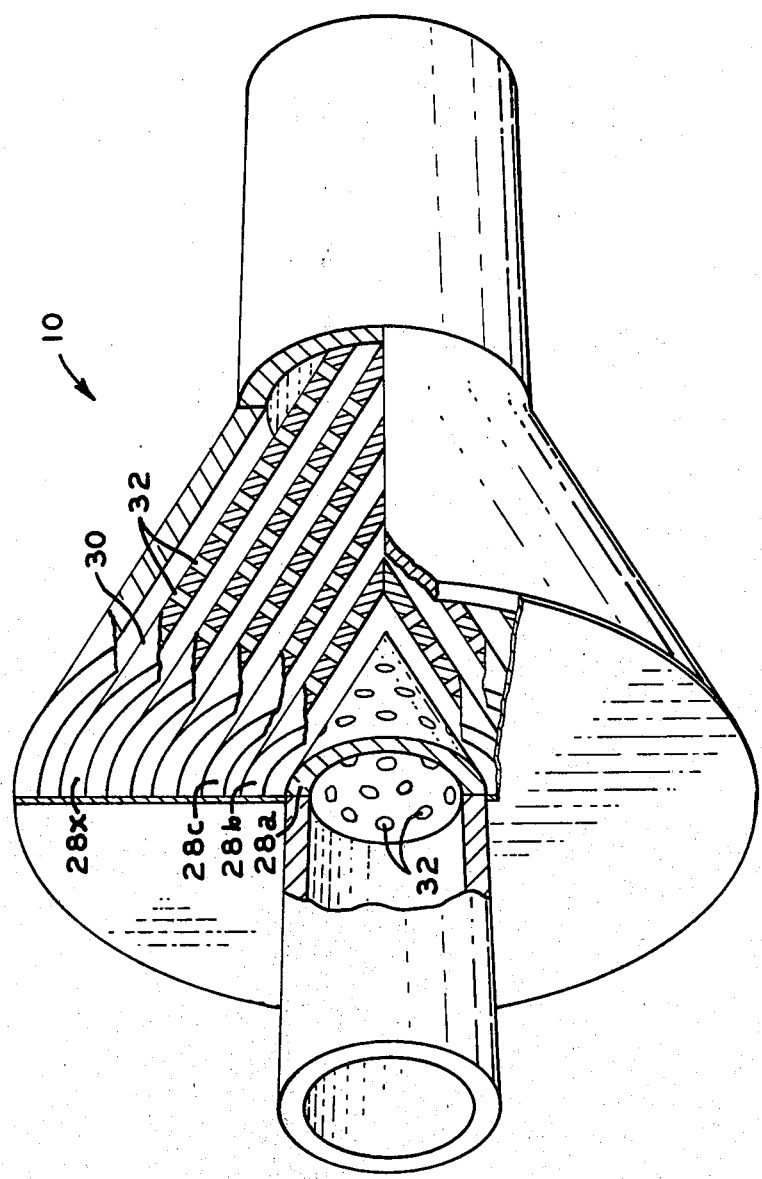
FIG. 2 is a fragmented, perspective view of the pressure letdown device shown in FIG. 1.

As shown in the drawings, the pressure letdown device 10 consists of any number N of letdown stages n, designated in the drawings by reference numerals 28a, 28b, 28c and 28x, each being defined by a baffle plate 30. Each stage of letdown includes a baffle plate 30, which, in effect defines the stage, FIG. 2. The plates 30 should be of symmetrical configuration such as flat, or conical, as shown. The baffle plates define the stages 28a through 28x and, as shown, are disposed in mutually spaced, coaxially nested alignment.

A typical letdown device 10, fabricated and constructed in accordance with the principles of the instant invention, included 20 stages with the baffle plates 30 thereof provided with port-like apertures 32 large enough readily to accommodate passage of particulates having a size within a range of 10 to 100 microns. For example, apertures having a diameter of 0.25 inches functioned quite satisfactorily for this purpose. The baffle plate, or stage 28a, included relatively few apertures 32. Each succeeding baffle plate 30 was provided with a greater number of apertures 32, in order to facilitate an increased volumetric flow of fluid as the pressure was reduced. In practice, the precise number of apertures provided for each baffle plate is selected on a basis which provides for the establishment of a common pressure drop across each of the baffle plates.

For the aforementioned device 10 fabricated according to the principles of the instant invention, the number of stages, pressure values, pressure drops, and number of apertures in the baffle plates for a number of stages, designated N, would be calculated as follows:

The mass flow rate m through each aperture depends upon the pressure applied to the aperture, the cross sectional area of the aperture, and the pressure ratio across the baffle. These quantities are related to each other in accordance with a formula set forth by St. Venant and Wanzel (See p. 32 of Liepmann and Puckett, "Introduction to Aerodynamics of a Compressible Fluid", John Wiley & Sons, Inc., N.Y. 1947). This formula is:

$$\dot{m} = A \sqrt{P_0 \, \rho_0 \frac{2\gamma}{\gamma - 1} \left(\frac{p}{p_0}\right)^{\frac{2}{\gamma}} \left[1 - \left(\frac{p}{p_0}\right)^{\frac{\gamma-1}{\gamma}}\right]}$$

Where
A = area of an orifice
$P_0$ = input pressure
$\rho_0$ = density of incoming gas
p = pressure of the enviroment into which the orifice discharges
$\gamma$ = ratio of specific heats of the gas, here taken to be 1.4.
m = mass rate of flow The following values were used for the apertures in the plate of stage n:

$$p_0 = 8,618,000 \, N/m^2$$
$$\rho_0 = 125.9 \, kg/m^3$$
$$A = 0.00003167 \, m^2$$
$$\gamma = 1.4$$

$$\frac{p}{p_0} = 0.80160$$

Inserting the above values in the formula give $$m = 0.58324 \, kg/sec \, (1.293 \, lbs/sec)$$

for the mass rate of flow through one 0.25 inch aperture.

The pressure was letdown in 20 steps with a pressure ratio across each stage of 0.80160, each stage having 0.25 inch apertures. The following numerical quantities were used in making the calculations:

A = 0.049087 sq. in. = 0.00003167 meters² = m²
$p_0$ = 1250 psia = 8,618,000 Newtons/meter²
$\rho$ = 7.86 lbs/cu ft = 125.9 kg/meter³.

The density of the gas is determined by using the equation of state for gasses, viz., $$\rho = \frac{Mp}{RT}$$

$\rho$ = density of gas kg/m³
where
M = Molecular weight of the gas (=41.2)
p = Pressure of the gas in MKS units = 8,618,000 N/m³
R = Universal gas constant, 8317 (MKS units)
T = Absolute temperature, 339 K = 150° F.

Inserting the above quantities in the formula gives the density of the gas coming into the pressure letdown as 125.9 kg/m³ = 7.86 lbs/cu. ft.

The velocity of the gas through the orifice is the same in each of the orifices, and is calculated using the known continuity equation, which is $$v = \frac{\dot{m}}{A\rho} = \frac{0.58647}{0.00003167 \times 125.9} = 147.1 \, m/sec = 482.6 \, ft/sec.$$

The speed of sound in the gas is obtained from the formula $$c = \sqrt{\gamma \frac{p}{\rho}} = \sqrt{1.4 \frac{8618000}{125.9}} = 310 \text{ m/sec} = 1016 \text{ ft/sec}$$

and the Mach number is the ratio of the flow velocity to the velocity of sound. The speed of sound, as found above, is 310 meters/sec (1016 feet/sec), and the flow velocity found is 482.6 feet/sec, thus giving a Mach number of 0.475.

The total number of stages as a function of the pressure ratio is given by the formula:

$$N = \frac{\log p_0/p_N}{\log p_n/p_{n+1}}$$

Where
n = stage number.
N = total number of stages.

The flow velocity through each orifice can be controlled by choosing a suitable number of stages in the overall system. The greater the number of stages of letdown, the slower the flow velocity through the orifices, in the pressure letdown device and, of course, the less the erosion. Hence, there is a trade-off; the lower the output flow velocity required, the more stages of letdown needed.

In the aforementioned example, the given initial pressure is 1250 psia, and the final pressure is 15 psia. This gives a ratio of 83.333. For twenty stages of letdown, the ratio for each stage of letdown is 0.80160, calculated as follows:

$$\frac{1250}{15} = 83.333$$

$$\frac{1}{20} \log 83.333 = 0.09604$$

$$20 = \frac{\log 83.333}{\log \frac{1}{0.80160}} = N.$$

$$\frac{p_n}{p_{n+1}} = \text{anti log } 0.09604 = 0.80160 = \frac{p_n}{p_{n+1}}$$

For the case of a gasification facility consuming 1000 tons/day, with a total weight of gas produced of 3333 tons/day with an average molecular weight of 41.2, the pressure fed into the pressure letdown is 1250 psia, (8,618,000 N/meter$^2$), with 13 kg/sec and a density of 125.9 kg/meter$^3$ (at a temperature of 150° F.).

The above values substituted in the aforementioned St. Venant and Wanzel formula give a table of values, for pressure for each stage of letdown, having an arbitrarily selected but unique and increasing number of 0.25 inch diameter apertures in each baffle.

| Stage number n | pressure psia $p_n$ | Delta p $\Delta p$ | No. apertures in baffle plates for stage n |
|---|---|---|---|
| 0 | 1250 | — | — |
| 1 | 1002 | 248 | 60 |
| 2 | 803.2 | 199 | 74 |
| 3 | 643.8 | 159 | 93 |
| 4 | 516.1 | 127 | 115 |
| 5 | 413.7 | 102 | 145 |
| 6 | 331.6 | 82 | 180 |
| 7 | 265.8 | 66 | 224 |
| 8 | 213.1 | 52.7 | 280 |
| 9 | 170.8 | 42 | 350 |
| 10 | 136.9 | 34 | 437 |
| 11 | 109.8 | 27 | 545 |
| 12 | 88.0 | 22 | 680 |
| 13 | 70.5 | 17 | 848 |
| 14 | 56.5 | 14 | 1058 |
| 15 | 45.3 | 11.2 | 1319 |
| 16 | 36.3 | 9.0 | 1646 |
| 17 | 29.1 | 7.2 | 2053 |
| 18 | 23.3 | 5.8 | 2562 |
| 19 | 18.7 | 4.6 | 3195 |
| 20 | 15.0 | — | 3987 |
| | | | 19,851 |

As in the porous plug experiment described in tests on the kinetic theory of gasses, the temperature of the gas does not change significantly as it passes through successive partitions, even though the volume of the flow is greatly increased. The flow velocity through each aperture of the baffle in the pressure letdown device 10 is dependent on the pressure ratio across the partition, and the pressure ratio is the same across every one of the successive partitions.

By determining a velocity at which entrainment can be maintained through all the stages of pressure letdown in order to prevent flashing and erosion, and by using the aforedescribed technique for arriving at a suitable number of stages, sizing of the orifice to accommodate passage of the particulates contained in the polyphase fluid, and the increasing volume through the device by a selection of an increasing number of apertures in successive stages, without affecting the desired constant velocity, pressure letdown with constant enthalpy can be achieved. Constant velocity or flow rate is characterized by the relationship:

At any point (x) in the system $P_x/P_0 = F_1(x)$ where $F_1(x) = P_1/P_0(x)$. The ratio of the inlet velocity to the average velocity at any point (x) in the system is then unity, and the residence time in the device 10 is equal to the number of stages in the letdown device divided by the outlet velocity.

Figure 3:
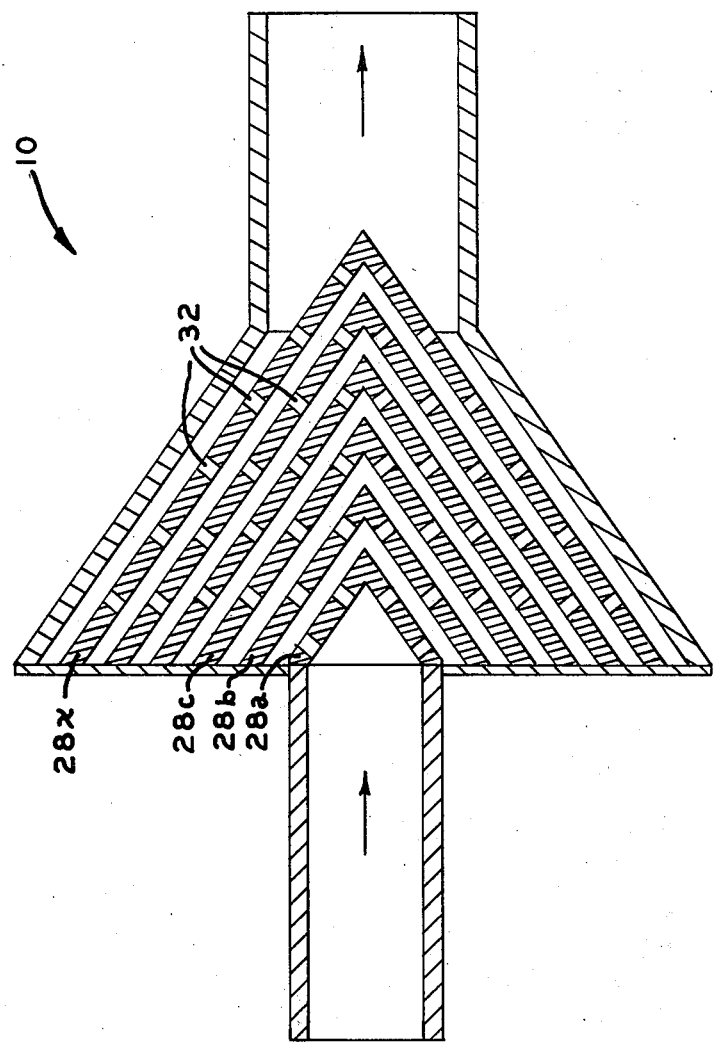
FIG. 3 is a cross-sectional view of the pressure letdown device shown in FIG. 2.

In addition to establishing the foregoing relationship, it is desirable to promote entrainment by inducing mixing of the phases during passage through the orifices in the device. This can be achieved by angling the axes of the aperatures in each stage to the direction of bulk flow so that lateral motion is induced in the flow between the stages. As shown in FIG. 3, this can be achieved by positioning the apertures of successive baffles so they are offset. The fluid follows a torturous path in moving through the space between the convex face of one baffle and the closely nested concave face of the next baffle.

It should now be apparent that the letdown device 10 is particularly suited to be connected with a source of high pressure polyphase fluid having entrained therein flashable gas and particulates, which heretofore subjected valves and the like to severe damage. The device includes a multiplicity of letdown stages, each comprising a baffle plate 30 having apertures of dimensions suitable for accommodating passage of polyhpase fluids. The baffle plates of successive stages n include increasing numbers of apertures for accommodating increased volumetric flow of fluid as the pressure is successively reduced at each stage.

In view of the foregoing, it should now be apparent that the device of the instant invention provides a practical solution to the problems heretofore encountered by designers of letdown devices for coal utilization systems.

What is claimed is:

1. In combination with a source of polyphase fluid having a discharge outlet for discharging a stream of fluid characterized by a first pressure greater than a second pressure and flowing at a substantially constant flow rate, a pressure letdown device for dropping the pressure of the fluid, comprising in combination:

A. means defining in said device an intake port, a discharge port, and a flow path extending between said ports for a stream of fluid flowing at a constant rate, said flow path being caused to communicate with said discharge outlet via said intake port for accepting said stream of fluid at the intake port and for causing the stream to flow at a constant velocity along said flow path from said intake port to said discharge port; and B. pressure dropping means disposed in said flow path for dropping the pressure of the fluid without reducing the velocity thereof, as the stream is caused to flow between said intake and discharge ports;

said pressure dropping means including a series of pressure letdown stages including a plurality of baffles of similar conical configurations disposed in coaxially nested alignment, and means defining in each of said baffles a plurality of apertures of uniform dimensions, the number of apertures for each baffle of said plurality of baffles being unique with respect to the number of apertures for each of the other baffles of said plurality.

2. A combination as defined in claim 1 wherein a common pressure ratio is established across each of the ports of said plurality, and the mass rate of flow for each aperture is a function of the area of the aperture, and the common pressure ratio of the fluid across the aperture.

* * * * *